Sept. 9, 1958            A. CINK            2,851,265
HAND CARRIAGE APPARATUS FOR FLAME CUTTING OF TUBES
Filed Sept. 25, 1956
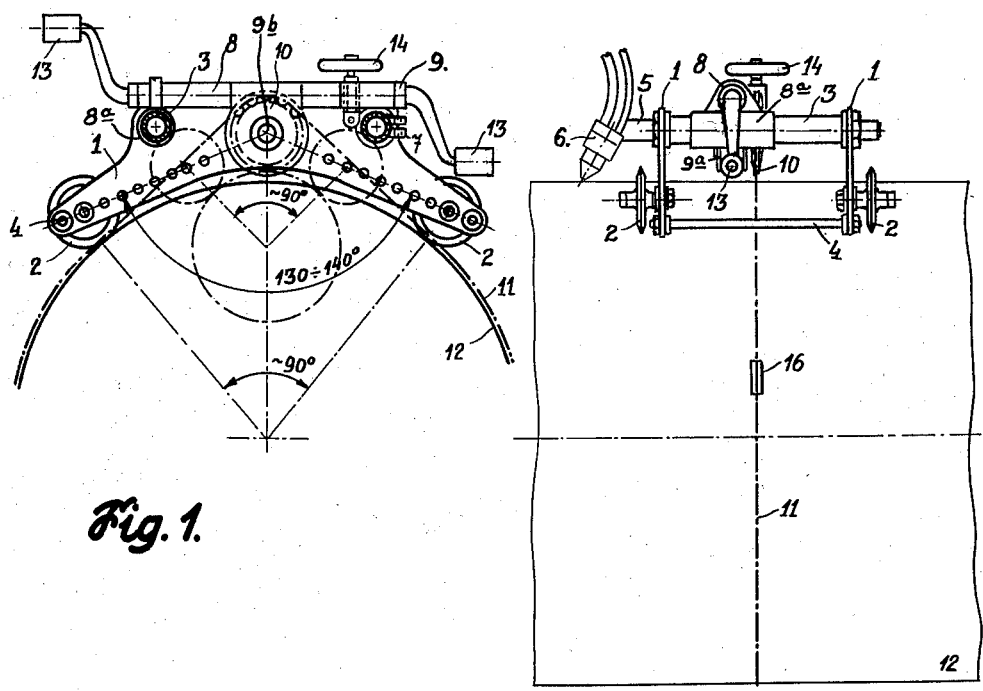
Fig. 1.
Fig. 3.
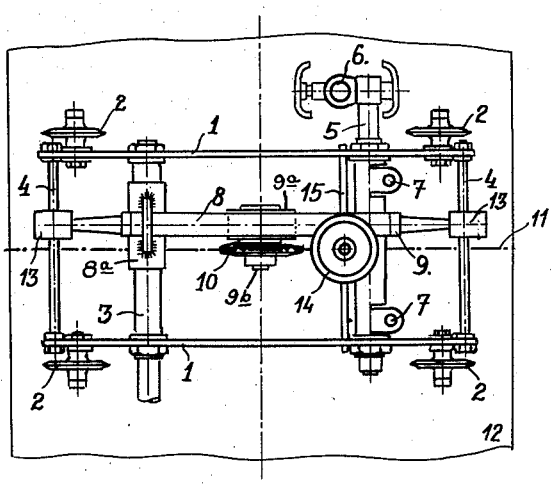
Fig. 2.
INVENTOR.
Albin Cink
BY

United States Patent Office 2,851,265
Patented Sept. 9, 1958

2,851,265

HAND CARRIAGE APPARATUS FOR FLAME CUTTING OF TUBES

Albin Cink, Vsetin, Czechoslovakia

Application September 25, 1956, Serial No. 611,991

Claims priority, application Czechoslovakia October 24, 1955

3 Claims. (Cl. 266—23)

The present invention relates to a hand operated carriage apparatus for flame cutting of tubes.

In technical practice there is a constant need for cutting or levelling tubes by flame, either at the ends or at other places, in planes perpendicular to the axis of the tube. These cuts may be provided with or without a chamfer for welding.

An object of the invention is to provide a device of the described character that is useful when the tube cannot rotate during cutting, which is true with outdoor assembly work or even in workshops, where a rotational device is not at hand. Further, an object is to provide apparatus of the described character having a small height, to make it easily usable when laying pipe lines and the like, and which is useful for a large range of pipe diameters. A further object is to provide apparatus embodying a simple and quick means of attaching the carriage apparatus to the tube along which it has to travel.

The hitherto used machines for cutting tubes do not comply with all of the above conditions. Either they are of complex construction or they are too high. Mostly they have a small range of use.

The apparatus according to the invention includes a low four-wheel carriage resiliently fastened by a chain to the pipe. The chain runs over a chain wheel, which is driven by handles (cranks) through a worm transmission gear, by which a regular movement of the carriage along the surface of the pipe is achieved. The wheels of the carriage are displaceable in such a manner, that the machine may be used for pipes having a range of diameters from 100 mm. up to 600 mm., and even more. The side walls of the apparatus are joined by means of two spacing tubes in which slidable rods, carrying the burners are mounted. The chain wheel is mounted on an arm, one end of which is rotatably mounted on one spacing tube and the other end is supported by a spring, which is tensioned by a screw provided with a hand wheel. The apparatus has two driving handles (cranks) in order to make possible easy operation from one side or the other side of the carriage during movement of the latter under the pipe. The worm transmission gear may be disconnected from the chain wheel to allow the apparatus to be moved without the use of the crank handles, which is advantageous in cutting small pipes and for centering the fastening chain. The apparatus has one or more burners, according to whether it is necessary to produce one or more cuts at the same time. The apparatus is fastened to the pipe by the chain which is provided with a releasable chain lock.

In the drawing an embodiment of the apparatus according to the invention is represented by way of example, Fig. 1 is a sectional view of the apparatus taken along the plane A—A of Fig. 2, Fig. 2 a top plan view, and Fig. 3 a side elevational view.

The illustrated apparatus includes two equal side walls 1 having four wheels 2 rotatably mounted thereon, in pairs, and adapted to be displaced along the side walls, as required. The side walls 1 are connected by two spacing tubes 3 and two spacing rods 4. In the spacing tubes 3, rods 5 are slidably and rotatably mounted and carry burners 6. The spacing tubes 3 are provided with clamps 7, in order to secure the rod 5 of the burner 6 in the required position. As shown in Figs. 1 and 2, each clamp 7 may be formed by a radially split end portion of the related tube 3 having projecting, apertured lugs through which a clamping screw may extend so that, upon tightening of such clamping screw, the radially split end portion of the tube 3 will be drawn tight upon the rod 5 in the latter to secure the rod 5 in an adjusted position relative to the tube 3. Although only the tube 3 at the right of Figs. 1 and 2 is illustrated with clamps 7 at the opposite end portions thereof, it is to be understood that the other spacing tube 3 may be similarly provided with clamps. A tubular arm 8 extending at right angles to the tubes 3 is mounted, adjacent one end, on one of the spacing tubes 3 and is free to swing relative to that spacing tube about the axis of the latter. A worm 9 is rotatably mounted in the tubular arm 8 which has an opening for permitting engagement of the worm 9 with a worm wheel or gear 9a on a stud shaft 9b that is rotatably supported from the arm 8 with the axis of the shaft 9b being parallel to the axes of the tubes 3.

As shown in Figs. 1 and 2, the swingable mounting of the tubular arm 8 on one of the spacing tubes 3 may be achieved by providing a laterally extending, open-ended sleeve 8a welded to the arm 8 adjacent one end of the latter and rotatably mounted on one of the tubes 3.

The worm wheel 9a is rigidly connected with a chain wheel or sprocket 10, over which passes a chain 11, surrounding the tube 12, to be cut. The chain wheel 10 is driven by way of the worm gear 9a and the worm 9 by means of hand operated crank handles 13 at the opposite ends of the worm 9. At the other end of the arm 8 a screw 14 is threadably mounted, and the latter is supported against a rod or leaf spring 15, which passes, at its opposite ends, through both side walls 1 and is secured against falling out. The worm gear transmission may be disconnected by known means, so that the chain wheel 10 is released and the entire apparatus may be freely moved around the tube 12. This is necessary on the one hand in order to straighten the chain prior to cutting, when the chain has been fastened at an angle, and on the other hand in order to avoid the necessity of turning the handles 13, when cutting tubes of a small diameter, because it is possible to move the entire apparatus around the tube without using the worm gear. The adjustment of the wheels 2 for a given diameter of the tube is carried out in such a way, that the connecting line of the centers of the wheels 2 and the center of the tube 12 to be cut form an angle of about 90°; the mounting of the carriage on the tube is then most perfect, as it approaches a prismatic mounting.

For that purpose the side walls 1 are provided with two series of apertures for receiving the axles of the wheels 2, the axes of these apertures lying in two planes at opposite sides of the shaft 9b, which enclose an angle of 130 to 140°, preferably 135°.

In Fig. 1 the position of the wheels when using the apparatus on a tube of relatively small diameter is shown in dotted lines.

A chain lock 16 provides such a connection of the chain, that the chain wheel 10 may freely pass underneath the point of connection. Such a chain lock is the subject matter of my copending application for United States Letters Patent, Serial No. 612,011.

The wheels 2 are rotatably mounted in selected apertures in the side walls 1 according to the diameter of the tube to be cut. The apparatus is placed on the tube, the arm 8 lowered by the screw 14 as far as possible, the chain 11 wound around the tube 12 and the chain lock 16 closed. By means of the screw 14, the arm 8 is angularly raised until the chain becomes tensioned. The screw 14 abuts against the rod spring 15 and after further application of the screw 14, the spring 15 starts to bend downwards so that the wheels 2 are resiliently pressed against the tube 12. One or more burners are placed in the clamps on the rods 5, adjusted in the required position and secured by a clamp 7. After igniting the flame, the handle 13 is turned by hand in such a way, that a suitable feeding velocity of the cutting operation is achieved. Tightening of the screw 14 is effected to such an extent as to prevent the entire apparatus together with the cutting burners from dropping under its own weight, then travelling around the tube.

The apparatus according to the invention has a considerable range of use, for example for a diameter of the cut tube from 100 to 600 mm. and more, is simple, of light weight and of small overall height, requiring therefore only a small space around the cut tube. It is suitable for workshops, for work out-of-doors and particularly for assembly work. The apparatus allows cutting in any position of the tubes. If required, it may be provided with an electric drive so as to achieve automatic cutting, which is of advantage when cutting a large number of tubes, for example in workshops.

I claim:

1. In an apparatus for flame cutting tubes; the combination of a carriage having two identical parallel side walls, two pairs of wheels adapted to roll circumferentially around the surface of a tube to be cut, means rotatably mounting said pairs of wheels on said side walls and being displaceable along the latter to vary the relative positions of said pairs of wheels, open ended spacing tubes extending between said side walls and retaining the latter in parallel, spaced apart relationship, an arm mounted at one end on one of said spacing tubes and swingable about the axis of said one spacing tube, a sprocket rotatably mounted on said arm intermediate the opposite ends of the latter with the axis of said sprocket extending parallel to the axes of said wheels, hand operated means carried by said arm for effecting rotation of said sprocket, a chain running over said sprocket and adapted to encircle a tube to be cut, a resilient member extending between said side walls, and a screw threadably carried by said arm adjacent the other end of the latter and abutting against said resilient member so that, by adjusting said screw, said arm is angularly displaced relative to said side walls thereby to cause said sprocket to tension said chain around a tube to be cut encircled by the latter and to cause the carriage to move around the tube in response to rotation of said sprocket.

2. In an apparatus for flame cutting tubes; the combination as in claim 1, wherein said means rotatably mounting said wheels on said side walls include two series of spaced apart openings in each of said side walls with the openings of each series in one of said walls being axially aligned with the openings of the corresponding series in the other of said side walls, and with the two series of openings of both side walls lying in respective planes enclosing an angle of from 130 to 140 degrees.

3. In an apparatus for flame cutting tubes; the combination as in claim 1, further comprising rods slidably telescoping in said spacing tubes and adapted to support cutting burners, thereby to permit simultaneous cutting with two burners at any desired side of the carriage.

References Cited in the file of this patent

UNITED STATES PATENTS

| 1,879,346 | Lawrence | Sept. 27, 1932 |
| 1,981,340 | Anderson | Nov. 20, 1934 |
| 2,596,322 | Zumwalt | May 13, 1952 |

FOREIGN PATENTS

| 679,731 | Great Britain | Sept. 24, 1952 |
| 1,081,295 | France | June 9, 1954 |